United States Patent
Jaffrey et al.

(10) Patent No.: US 9,587,461 B1
(45) Date of Patent: Mar. 7, 2017

(54) SYSTEMS AND METHODS FOR MONITORING BLOWOUT PREVENTER EQUIPMENT

(71) Applicant: Cameron International Corporation, Houston, TX (US)

(72) Inventors: Andrew Jaffrey, Oldmeldrum (GB); Emanuel Gottlieb, Pittsburgh, PA (US); Salvador Reyes, III, Houston, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 14/851,541

(22) Filed: Sep. 11, 2015

(51) Int. Cl.
*E21B 34/04* (2006.01)
*E21B 33/06* (2006.01)
*E21B 33/064* (2006.01)

(52) U.S. Cl.
CPC .................. *E21B 34/04* (2013.01)

(58) Field of Classification Search
CPC ........ E21B 34/04; E21B 33/06; E21B 33/062; E21B 33/063; E21B 33/064
See application file for complete search history.

(56) References Cited

U.S. PATENT DOCUMENTS

| | | | |
|---|---|---|---|
| 3,855,847 A | 12/1974 | Leschek | |
| 3,858,439 A | 1/1975 | Nakamura | |
| 3,985,024 A | 10/1976 | Horak | |
| 4,009,463 A | 2/1977 | Vercellotti et al. | |
| 4,033,179 A | 7/1977 | Romrell | |
| 4,188,830 A | 2/1980 | Mason et al. | |
| 4,297,885 A | 11/1981 | Hein, Jr. et al. | |
| 4,731,744 A * | 3/1988 | Harrell, Jr. | G01D 5/34776 33/314 |
| 4,922,423 A * | 5/1990 | Koomey | E21B 33/063 166/373 |
| 5,014,781 A * | 5/1991 | Smith | E21B 19/00 166/384 |
| 5,407,172 A * | 4/1995 | Young | E21B 33/062 137/554 |
| 6,478,087 B2 * | 11/2002 | Allen | E21B 47/0001 166/250.01 |
| 7,832,706 B2 * | 11/2010 | Judge | E21B 33/062 166/85.4 |
| 9,163,471 B2 | 10/2015 | Coonrod et al. | |
| 9,187,974 B2 | 11/2015 | Coonrod et al. | |
| 2006/0213365 A1 * | 9/2006 | Dorr | F15B 1/24 92/5 R |

(Continued)

*Primary Examiner* — Matthew R Buck
(74) *Attorney, Agent, or Firm* — Fletcher Yoder, P.C.

(57) ABSTRACT

A system for a blowout preventer (BOP) stack assembly includes one or more pairs of ultrasonic transducers coupled to a body that is configured to support a movable component of the BOP stack assembly, wherein each pair of ultrasonic transducers comprises a first ultrasonic transducer disposed on a first side of the body and a second ultrasonic transducer disposed on a second side of the body, opposite the first side. The system also includes a controller configured to receive a first signal indicative of a position of the movable component from the one or more pairs of ultrasonic transducers, to determine the position of the movable component based on the first signal, and to provide a first output indicative of the position of the movable component.

20 Claims, 11 Drawing Sheets

(56) References Cited

U.S. PATENT DOCUMENTS

| | | | | |
|---|---|---|---|---|
| 2008/0040070 A1* | 2/2008 | McClanahan | E21B 33/062 | 702/158 |
| 2010/0152901 A1* | 6/2010 | Judge | E21B 33/062 | 700/275 |
| 2012/0000646 A1* | 1/2012 | Liotta | E21B 33/062 | 166/85.4 |
| 2012/0001101 A1* | 1/2012 | Dietz | E21B 33/062 | 251/1.3 |
| 2013/0283917 A1* | 10/2013 | Coonrod | E21B 33/061 | 73/597 |
| 2013/0283919 A1* | 10/2013 | Coonrod | E21B 33/0355 | 73/632 |

* cited by examiner

SYSTEMS AND METHODS FOR MONITORING BLOWOUT PREVENTER EQUIPMENT

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

A blowout preventer (BOP) stack is installed on a wellhead to seal and control an oil and gas well during drilling operations. A drill string may be suspended inside a drilling riser from a rig through the BOP stack into the well bore. During drilling operations, a drilling fluid is delivered through the drill string and returned up through an annulus between the drill string and a casing that lines the well bore. In the event of a rapid invasion of formation fluid in the annulus, commonly known as a "kick," the BOP stack may be actuated to seal the annulus and to control fluid pressure in the wellbore, thereby protecting well equipment disposed above the BOP stack. However, current BOP systems may not effectively monitor components of the BOP stack.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present embodiments are generally directed to systems and methods for monitoring BOP equipment. More particularly, the present embodiments are directed to systems and methods that utilize ultrasonic transducers to monitor a state (e.g., a position, a condition, or the like) of a component of a BOP stack assembly. For example, in some embodiments, ultrasonic transducers may be disposed on a body of a BOP (e.g., a ram BOP) of the BOP stack assembly. In some such embodiments, the ultrasonic transducers may be utilized to monitor a position of a moving component of the BOP, such as a ram or a piston. In some embodiments, the ultrasonic transducers may be disposed on a body of an accumulator of the BOP stack assembly and may be utilized to monitor a position of a piston of the accumulator. In certain embodiments, the ultrasonic transducers may include phased array ultrasonic transducers. In some embodiments, the phased array ultrasonic transducers may enable imaging of a component of the BOP, such as the ram, the piston, and/or a seal (e.g., a packer, an elastomer seal, a metal seal, a metal end cap seal, or the like) disposed on a contacting surface of the ram. The phased array ultrasonic transducers may be part of an imaging system. In certain embodiments, the phased array ultrasonic transducers may enable imaging of a tubular string (e.g., drill string) disposed within a bore of the BOP. The phased array ultrasonic transducers may further enable visualization and/or detection of a condition (e.g., wear or deterioration) of the one or more seals. In certain embodiments, the systems and methods may provide an output (e.g., a visual and/or an audible output) indicative of the state of the component of the BOP and/or of the tubular string.

Figure 1:
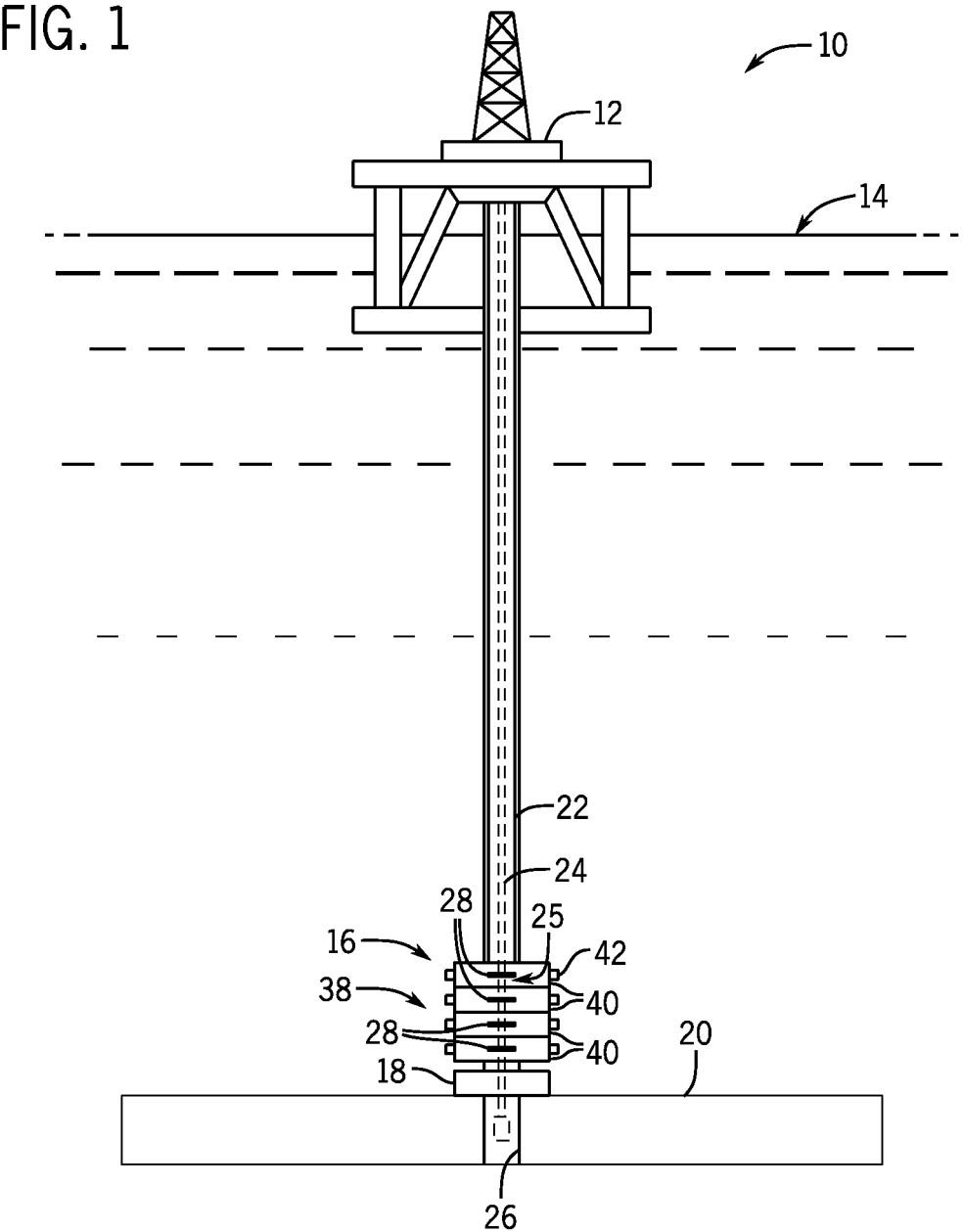
FIG. 1 is a schematic diagram of an offshore system in accordance with an embodiment of the present disclosure.

With the foregoing in mind, FIG. 1 is an embodiment of an offshore system 10. The offshore system 10 includes an offshore vessel or platform 12 at a sea surface 14. A BOP stack assembly 16 is mounted to a wellhead 18 at a sea floor 20. A tubular drilling riser 22 extends from the platform 12 to the BOP stack assembly 16. The riser 22 may return drilling fluid or mud to the platform 12 during drilling operations. Downhole operations are carried out by a tubular string 24 (e.g., drill string, production tubing string, or the like) that extends from the platform 12, through the riser 22, through a bore 25 of the BOP stack assembly 16, and into a wellbore 26.

To facilitate discussion, the BOP stack assembly 16 and its components may be described with reference to an axial axis or direction 30, a longitudinal axis or direction 32, and a lateral axis or direction 34. As shown, the BOP stack assembly 16 includes a BOP stack 38 having multiple BOPs 40 (e.g., ram BOPs) axially stacked (e.g., along the axial axis 30) relative to one another. As discussed in more detail below, each BOP 40 includes a pair of longitudinally opposed rams and corresponding actuators 42 that actuate and drive the rams toward and away from one another along the longitudinal axis 32. Although four BOPs 40 are shown, the BOP stack 38 may include any suitable number of BOPs (e.g., 1, 2, 3, 4, 5, 6, 7, 8, 9, 10 or more). Additionally, the BOP stack 38 may include any of a variety of different types of rams. For example, in certain embodiments, the BOP stack 38 may include one BOP 40 having opposed shear rams or blades configured to sever the tubular string 24 and seal off the wellbore 26 from the riser 22 and one or more BOPs 40 having opposed pipe rams configured to engage the tubular string 24 and to seal the bore 25 (i.e., the annulus around the tubular string 24 disposed within the bore 25). As discussed in more detail below, ultrasonic transducers 28 may be coupled to each of the BOPs 40 to facilitate monitoring a state (e.g., a position, a condition, or the like) of components (e.g., a ram, a piston, a seal) of the BOP 40 and/or a state of the tubular string 24. In some embodiments, the ultrasonic transducers 28 may be retrofitted to existing BOPs 40.

Figure 2:
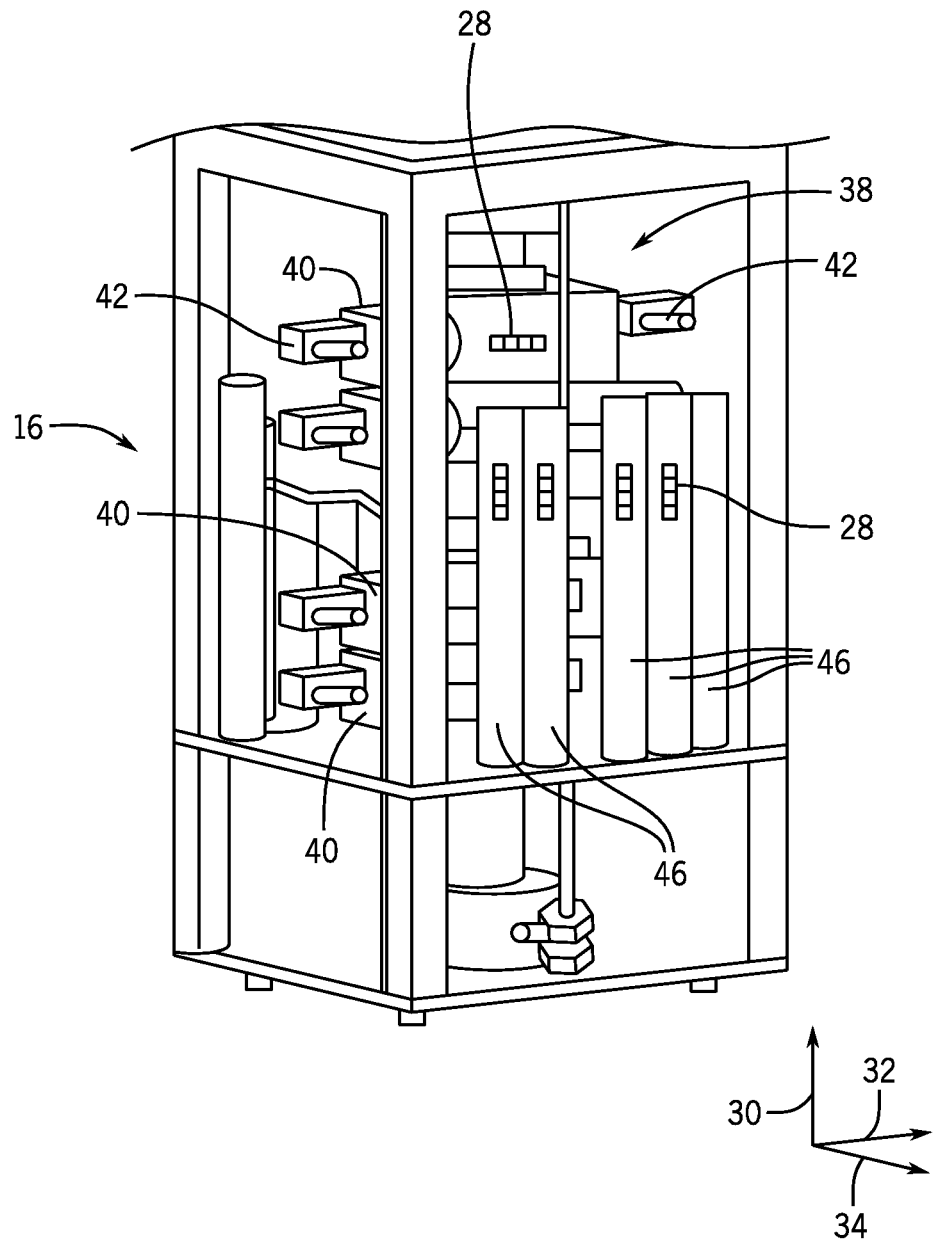
FIG. 2 is a perspective view of an embodiment of a BOP stack assembly that may be used in the offshore system of FIG. 1.

FIG. 2 is a perspective view of an embodiment of the BOP stack assembly 16. As discussed above, the BOP stack 38 includes multiple BOPs 40 axially stacked (e.g., along the axial axis 30) relative to one another. As shown, the BOP stack 38 also includes one or more hydraulic accumulators 46. The hydraulic accumulators 46 may supply hydraulic pressure to the actuators 42 that are configured to drive the rams of the BOPs 40. As noted above, ultrasonic transducers 28 may be provided to facilitate monitoring a state of a component (e.g., a ram, a piston, a seal) of the BOP 40 and/or of the tubular string 24. The state may include a position of a movable component, a condition, such as wear, or a combination thereof. Additionally or alternatively, in some embodiments, ultrasonic transducers 28 may be coupled to each of the hydraulic accumulators 46 to facilitate monitoring a state of movable components (e.g., a piston) of the hydraulic accumulator 46.

Figure 3:
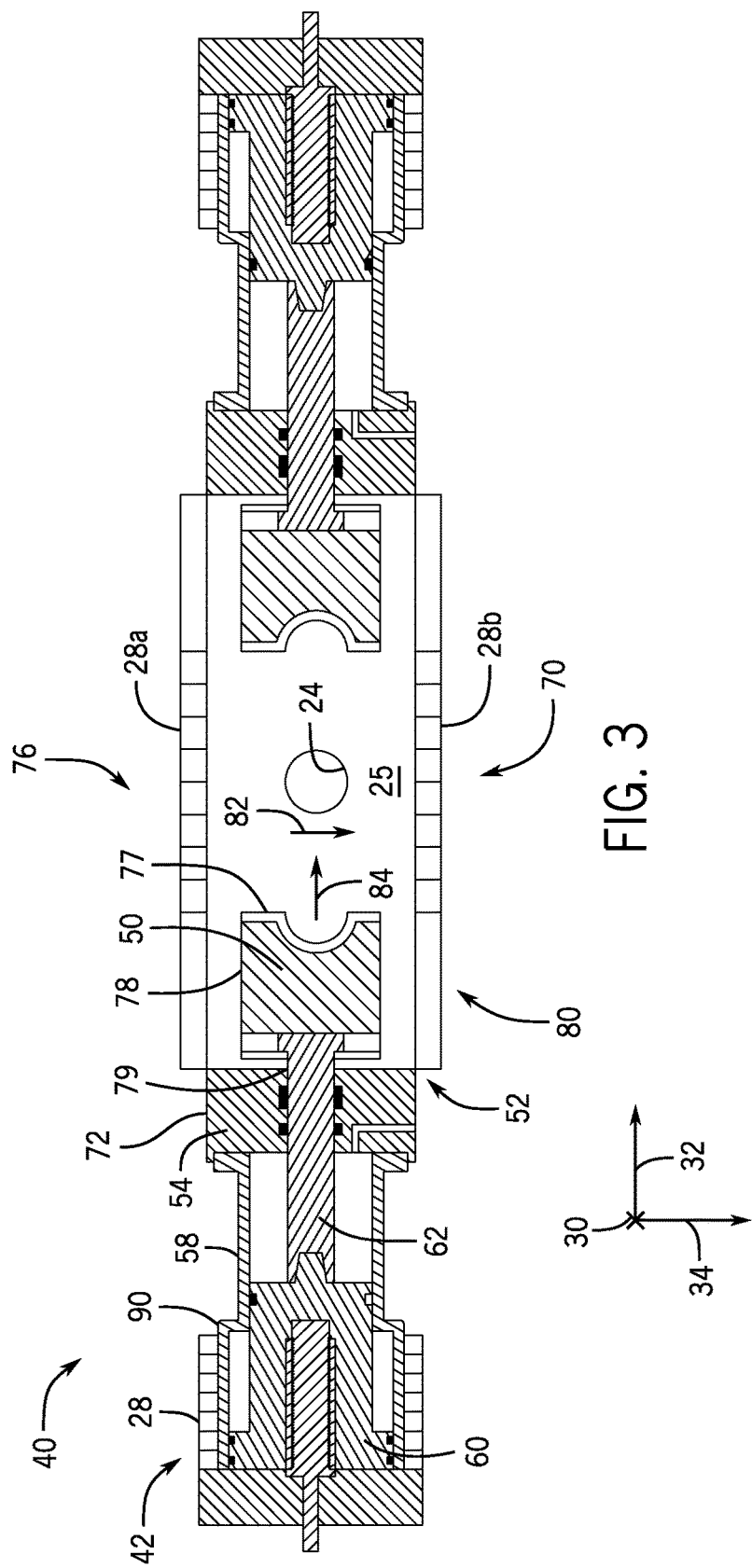
FIG. 3 is a cross-sectional top view of a portion of a BOP of the BOP stack assembly of FIG. 2, wherein a ram is in an open position.

FIG. 3 is a cross-sectional top view of a portion of one BOP 40 with opposed rams 50 in an open position 52. In the open position 52, each ram 50 is withdrawn from the bore 25, does not contact the tubular string 24, and/or does not contact the corresponding opposed ram 50. As shown, the BOP 40 includes a body 54 (e.g., housing) surrounding the bore 25. The body 54 is generally rectangular in the illustrated embodiment, although the body 54 may have any cross-sectional shape, including any polygonal shape or an annular shape. A bonnet assembly 58 is mounted to the body 54 (e.g., via threaded fasteners). The bonnet assembly 58 may support the actuators 42, which each include a piston 60 and a connecting rod 62. The actuators 42 may drive the opposed rams 50 toward and away from one another along the longitudinal axis 32 and through the bore 25 to shear the tubular string 24 or to seal the bore 25 (i.e., the annulus about the tubular string 24).

The ultrasonic transducers 28 may be coupled to an exterior surface 72 of the body 54 of the BOP 40. In some embodiments, the ultrasonic transducers 28 may be arranged to form one or more pairs of ultrasonic transducers 70. In the illustrated embodiment, each pair of ultrasonic transducers 70 includes a first transducer 28a on a first lateral side 76 of the body 54 and a corresponding second transducer 28b on a second lateral side 80 of the body 54, opposite the first lateral side 76. The first transducer 28a and the second transducer 28b of each pair of ultrasonic transducers 70 are longitudinally aligned with one another (e.g., along the longitudinal axis 32). In the illustrated embodiment, the first transducers 28a of multiple pairs of ultrasonic transducers 70 are coupled to one another and the second transducers 28b of multiple pairs of ultrasonic transducers 70 are coupled to another, thereby forming opposing rows (e.g., laterally opposing rows) of transducers 28 that extend longitudinally (e.g., along the longitudinal axis 32) along the body 54 of the BOP 40. In some embodiments, multiple opposing rows of transducers 28 may extend longitudinally along the body 54 of the BOP 40.

In some embodiments, the first transducer 28a and the second transducer 28b may be discrete transducers each having one or more piezoelectric elements. In some embodiments, the first transducer 28a and the second transducer 28b may be configured to operate in a pitch catch mode in which an acoustic wave emitted by one transducer is detected by another corresponding transducer. For example, in some embodiments, the first transducer 28a may be configured to operate as an emitter and the second transducer 28b may be configured to operate as a detector. In particular, the first transducer 28a may emit an acoustic wave in a direction approximately perpendicular to a direction of travel of the ram 50 (e.g., perpendicular to the longitudinal axis 32) along a path 82 toward the corresponding second transducer 28b. The corresponding second transducer 28b may detect the acoustic wave if the ram 50 does not block the path 82. Thus, detection of the acoustic wave at the second transducer 28b and/or absence of detection of the acoustic wave at the second transducer 28b may be indicative of a position (e.g., along the longitudinal axis 32) of the rams 50.

For example, while the ram 50 is in the open position 52, at least one or more of the second transducers 28b may detect acoustic waves emitted by corresponding first transducers 28a. As the ram 50 moves from the open position 52 into the bore 25 as shown by arrow 84, the ram 50 may block detection of acoustic waves by a progressively greater number of the second transducers 28b. Each of the second transducers 28b may be configured to generate a signal in response to detection of acoustic waves, and the signal may be provided to a controller that is configured to process the signal to determine a position of the rams 50. Additionally or alternatively, in some embodiments, the second transducers 28b may be configured to emit acoustic waves, and each first transducer 28a may be configured to detect acoustic waves emitted by the corresponding second transducer 28b.

Additionally or alternatively, in some embodiments, the first transducer 28a and/or the second transducer 28b of each of the one or more pairs of ultrasonic transducers 70 may be configured to emit acoustic waves and to receive reflected acoustic waves reflected from a surface 78 of the ram 50 or from a surface 79 of the connecting rod 62. For example, the first transducer 28a and/or the second transducer 28b may be excited by respective drive signals to emit respective acoustic waves, and then the first transducer 28a and/or the second transducer 28b may receive respective reflected acoustic waves if the ram 50 is positioned between the first transducer 28a and the corresponding second transducer 28b. The first transducer 28a and/or the second transducer 28b may generate signals in response to detection of the reflected acoustic waves. As discussed below, a controller may be configured to process the signals generated by the first transducer 28a and/or the second transducer 28b to determine the position of the rams 50.

In the illustrated embodiment, eight pairs of ultrasonic transducers 70 extend longitudinally on the exterior surface 72 of the body 54. Although eight pairs of ultrasonic transducers 70 are shown, any suitable number of pairs of ultrasonic transducers 28 (e.g., 1, 2, 3, 4, 5, 6, 7, 8, 9, 10, 11, 12, 13, 14, 15, 16, 17, 18, 19, 20, 21, 22, 23, 24, 25 or more) may be provided. The number of pairs of ultrasonic transducers 70 and/or the spacing between each transducer 28 affects the accuracy of the determination of the position of the rams 50. As shown, the one or more pairs of ultrasonic transducers 70 are spaced (e.g., extend) longitudinally (e.g., along the longitudinal axis 32) across a portion of the bore 25 between respective contacting surfaces 77 (e.g., a front edge) of the opposing rams 50 while the rams 50 are in the open position 52 to enable detection of movement of the rams 50 toward the tubular string 24. However, in some embodiments, the one or more pairs of ultrasonic transducers 70 may extend longitudinally across any suitable portion of the bore 25. In some embodiments, the one or more pairs of ultrasonic transducers 70 may extend across the entire bore 25 (i.e., between longitudinal ends 79 of the bore 25).

Additionally or alternatively, as shown, ultrasonic transducers 28 may be provided on an exterior surface 90 the bonnet 58 of the BOP 40 to facilitate monitoring a position of the piston 60 of the actuator 42. The position of the piston 60 may be indicative of the position of the ram 50 (e.g., indicative of whether the ram 50 is in the open position 52, in a closed position, or a position therebetween). The ultrasonic transducers 28 may be arranged in one or more pairs of ultrasonic transducers 70 and may include any of the features discussed herein with respect to the one or more pairs of ultrasonic transducers 70 utilized to monitor the position of the rams 50.

Figure 4:
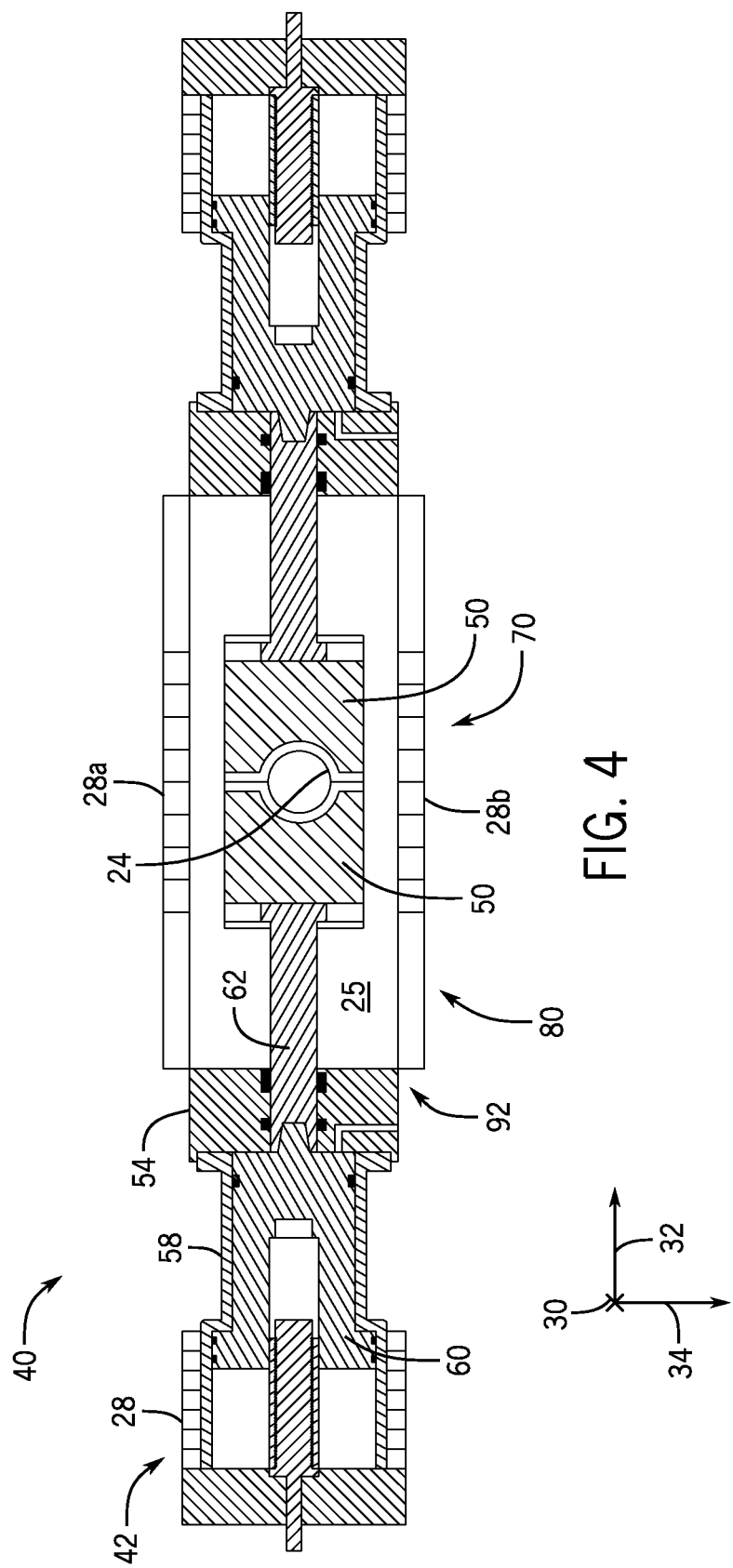
FIG. 4 is a cross-sectional top view of the portion of the BOP of FIG. 3, wherein the ram is in a closed position.

FIG. 4 is a cross-sectional top view of a portion of one BOP 40 having the opposed rams 50 in a closed position 92. In the closed position 92, each ram 50 is advanced into the bore 25, contacts the tubular string 24, and/or contacts a respective opposing ram 50. In the closed position 92, the rams 50 may seal the bore 25 (i.e., the annulus about the tubular string 24) and/or may block a flow of fluid from the wellbore 26 through the bore 25. As discussed above, detection of acoustic waves at the first transducers 28a and/or at the second transducers 28b may be indicative of a position (e.g., along the longitudinal axis 32) of the ram 50. For example, while the rams 50 are in the closed position 92, the ram 50 may block transmission of acoustic waves between the first transducer 28a and the corresponding second transducer 28b of each of the one or more ultrasonic transducer pairs 70. Thus, in some embodiments, while the rams 50 are in the closed position 92, none of the second transducers 28b detect acoustic waves emitted by corresponding first transducers 28a. Furthermore, in some embodiments, while the rams 50 are in the closed position 92, the first transducers 28a and/or the second transducers 28b may detect reflected acoustic waves. As discussed below, a controller may be configured to process the signals generated by the first transducer 28a and/or the second transducer 28b to determine the position of the rams 50.

Figure 5:
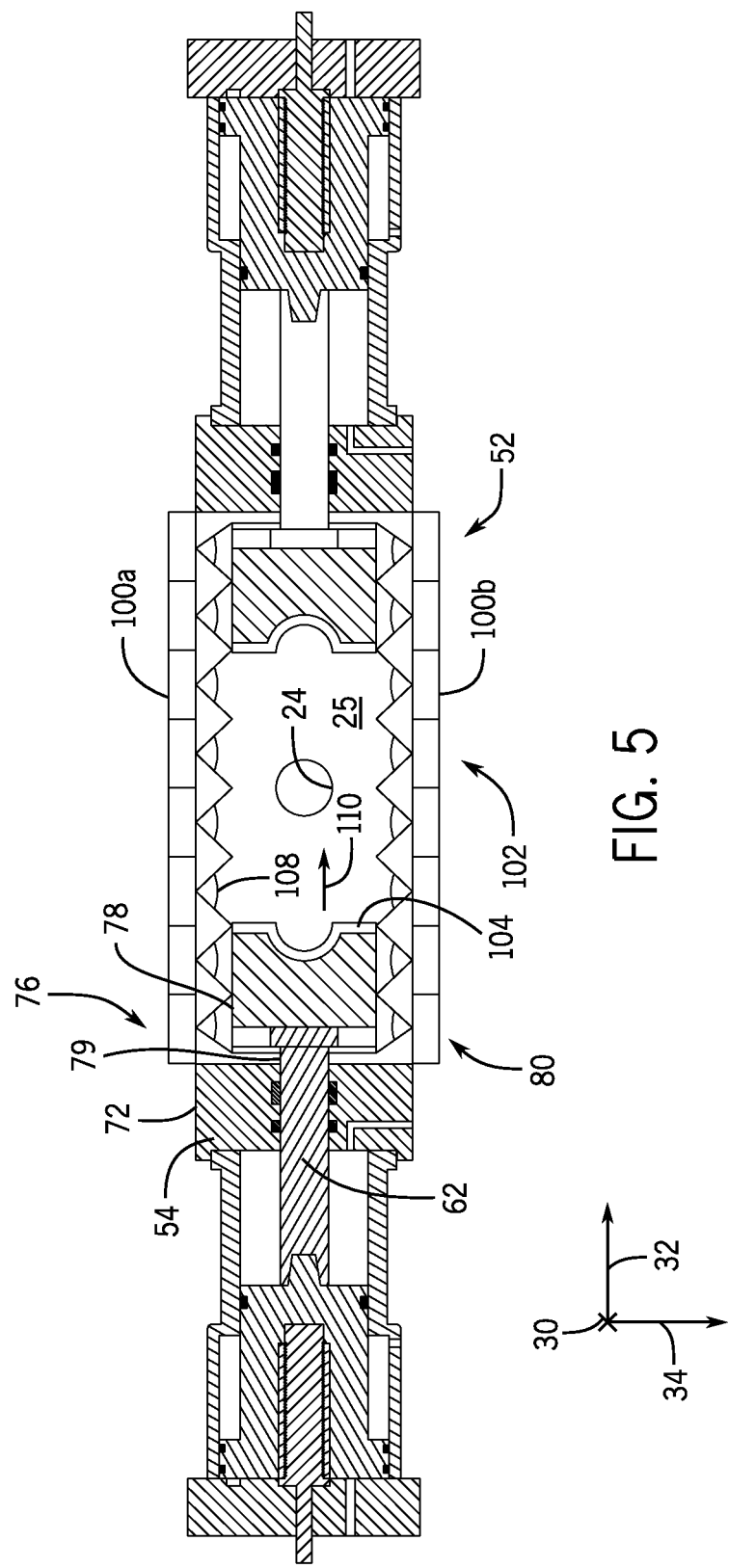
FIG. 5 is a cross-sectional top view of a portion of a BOP of the BOP stack assembly of FIG. 2 having phased array ultrasonic transducers.

In certain embodiments, the ultrasonic transducers 28 may be phased array ultrasonic transducers. Accordingly, FIG. 5 is a cross-sectional top view of a portion of the BOP 40 having phased array ultrasonic transducers 100. In some embodiments, the phased array ultrasonic transducers 100 may be coupled to the exterior surface 72 of the body 54 of the BOP 40. In some embodiments, the phased array ultrasonic transducers 100 may be arranged to form one or more pairs of phased array ultrasonic transducers 102. In the illustrated embodiment, each pair of phased array ultrasonic transducers 102 includes a first transducer 100a on the first lateral side 76 of the body 54 and the corresponding second transducer 100b on the second lateral side 80 of the body 54, opposite the first lateral side 76. The first transducer 100a and the second transducer 100b of each pair of phased array ultrasonic transducers 102 are longitudinally aligned with one another (e.g., along the longitudinal axis 32). In the illustrated embodiment, the first transducers 100a of multiple pairs of phased array ultrasonic transducers 102 are coupled to one another and the second transducers 100b of multiple pairs of phased array ultrasonic transducers 102 are coupled to another, thereby forming opposing rows (e.g., laterally opposing rows) of transducers 100 that extend longitudinally along the body 54 of the BOP 40.

Each phased array ultrasonic transducer 100a, 100b includes multiple piezoelectric elements. Furthermore, each phased array ultrasonic transducer 100a, 100b is configured to electronically steer (e.g., guide or direct) a beam of acoustic waves through an angle 108. The angle 108 may be any suitable angle for monitoring a portion of the BOP 40. For example, the angle 108 may be greater than approximately 20, 40, 60, 80, 100, 120, 140, or 160 degrees.

In some embodiments, the first transducer 100a and/or the second transducer 100b may be configured to operate in a pulse echo mode in which an acoustic wave emitted by one transducer is reflected and detected by the same transducer. In such cases, the first transducer 100a and/or the second transducer 100b may be configured to emit an acoustic wave and to detect the respective reflected acoustic wave (e.g., reflected by the surface 78 of the ram 50 or by the surface 79 of the connecting rod 62). Detection of the reflected acoustic wave at the first and/or second transducers 100a, 100b and/or absence of detection of the reflected acoustic wave at the first and/or second transducers 100a, 100b may be indicative of a position (e.g., along the longitudinal axis 32) of the ram 50. For example, detection of the respective reflected acoustic wave at the first and/or the second transducer 100a, 100b may indicate that the ram 50 is positioned between the first and the second transducer 100a, 100b.

As discussed in more detail below, the reflected acoustic waves received by the first transducer 100a and/or by the second transducer 100b may be converted into electrical signals and provided to a controller coupled to the BOP 40. In some embodiments, the controller may be configured to process the signals to determine a position of the rams 50. For example, the controller may be configured to generate an image (e.g., an outline image) of the rams 50 based on the signals and to determine the position of the rams 50 within the bore 25 based at least in part on the image (e.g., by aligning the image of the rams 50 within the monitored portion of the bore 25). As discussed in more detail below, in some embodiments, the controller may be configured to generate and/or output the image of the rams 50. For example, the controller may output the image of the rams 50 on a display to enable an operator to visualize the position of the rams 50. In certain embodiments, the displayed image may be updated as the rams 50 move to enable the operator to view the movement of the rams 50 within the bore 25.

In FIG. 5, each ram 50 is in the open position 52. While the rams 50 are in the open position 52, at least one or more of the first and/or second transducers 100a, 100b may not detect reflected acoustic waves because the rams 50 are not advanced through the bore 25. As the rams 50 move from the open position 52 into the bore 25 as shown by arrow 110, the rams 50 may reflect the acoustic waves toward a progressively greater number of the first and second transducers 100a, 100b. For example, when the rams 50 are in the closed position 92 discussed above, the rams 50 may reflect or block the acoustic waves emitted by all of the first and second transducers 100a, 100b.

In the illustrated embodiment, eight pairs of phased array ultrasonic transducers 100 are spaced (e.g., extend) longitudinally (e.g., along the longitudinal axis 32) on the exterior surface 72 of the body 54. Although eight pairs of ultrasonic transducers 100 are shown, any suitable number of pairs of phased array ultrasonic transducers 100 (e.g., 1, 2, 3, 4, 5, 6, 7, 8, 9, 10, 11, 12, or more) may be provided. The number of pairs of phased array ultrasonic transducers 100 and/or the spacing between the transducers 100 affects the accuracy of the determination of the position of the rams 50 and/or affects completeness of an image generated based on signals received from the phased array ultrasonic transducers 100. As shown, the one or more pairs of ultrasonic transducers 102 extend longitudinally across a length of the bore 25 (i.e., from one side of the bore 25 to the other side of the bore 25). However, in some embodiments, the one or more pairs of ultrasonic transducers 102 may extend longitudinally along any suitable portion of the length of the bore 25. For example, the one or more pairs of ultrasonic transducers 102 may only be provided at longitudinal positions along the body 54 of the BOP 40 that lie between respective contacting surfaces 77 (e.g., a front edge) of the opposing rams 50 while the rams 50 are in the open position 52 to enable detection of movement of the rams 50 toward the tubular string 24.

Additionally, although FIG. 5 shows one or more pairs of phased array ultrasonic transducers 102 having the first transducer 100a and the second transducer 100b, it should be understood that in some embodiments, one or more phased array ultrasonic transducers 100 may be provided on only one lateral side of the body 54 of the BOP 40. While pairs 102 of laterally opposed phased array ultrasonic transducers 100 may provide redundancy in measurement and/or a more complete image of the rams 50 or other components of the BOP 40, one or more phased array ultrasonic transducers 100 on one lateral side (e.g., the first lateral side 76 or the second lateral side 80) may provide sufficient information to enable the controller to generate an image, determine a condition (e.g., a wear condition) of a component of the BOP 40, and/or to determine the position of the ram 50, for example.

Figure 6:
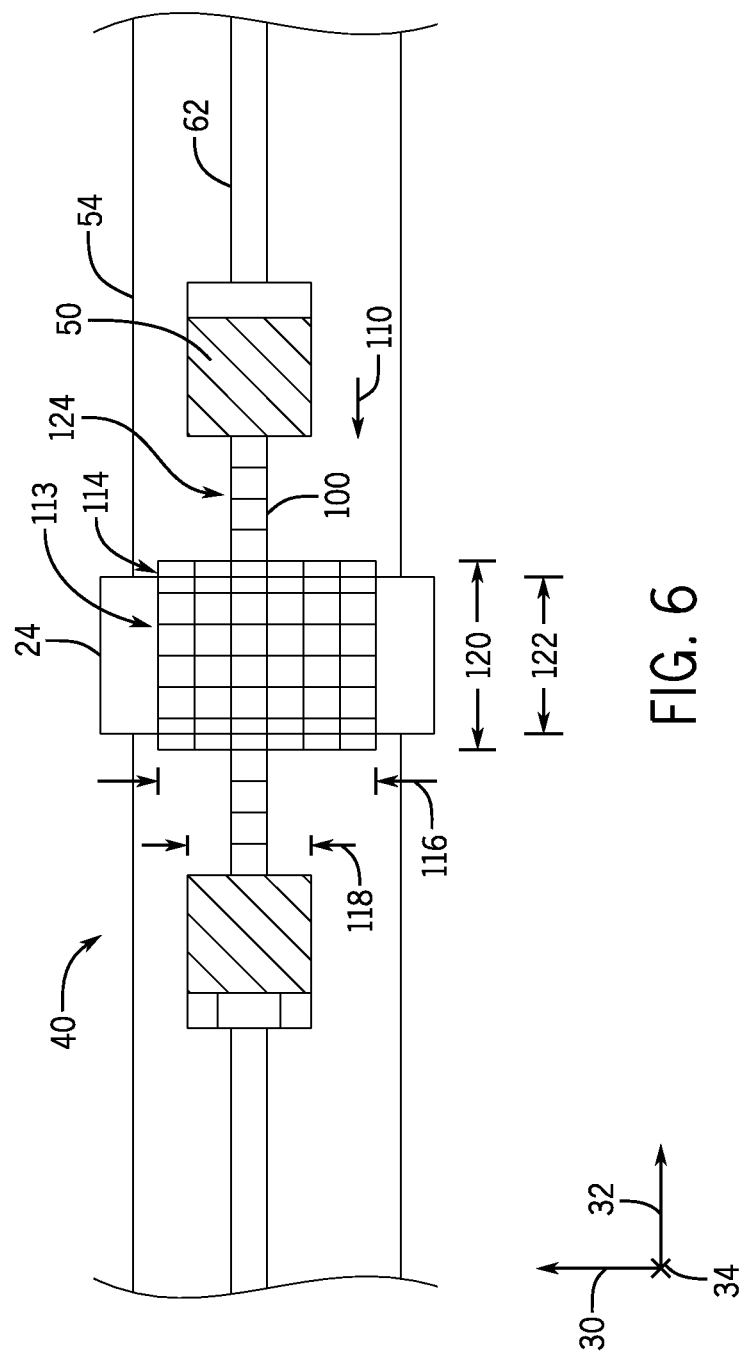
FIG. 6 is a cross-sectional side view of a portion of a BOP of the BOP stack assembly of FIG. 2 having phased array ultrasonic transducers extending axially along the BOP.

FIG. 6 is a cross-sectional side view of a portion of the BOP 40 having multiple phased array ultrasonic transducers 100. As shown, the multiple phased array ultrasonic transducers 100 may be coupled to one another and arranged in one or more columns 114 each extending axially (e.g., along the axial axis 30) of the BOP 40. Thus, the multiple phased array ultrasonic transducers 100 may extend along the axial axis 34 of the body 54 that is perpendicular to the direction of movement 110 of the ram 50. In some embodiments, the multiple phased array ultrasonic transducers 100 may be arranged in multiple columns 114 to form a grid 113 of phased array ultrasonic transducers 100 extending axially and longitudinally (e.g., along the longitudinal axis 32) to enable monitoring of a larger surface area of the ram 50, a seal 104 on the contacting surface 77 of the ram 50, and/or of the tubular string 24, for example. The grid 113 may include 2 to 50 phased array ultrasonic transducers 100 extending axially and 2 to 50 phased array ultrasonic transducers 100 extending longitudinally. In some embodiments, the grid 113 of multiple phased array ultrasonic transducers 100 may extend an axial height 116 greater than an axial height 118 of the rams 50 and/or may extend a longitudinal length 120 greater than a longitudinal length 122 of the tubular string 24. In some embodiments, as shown, one or more rows 124 of the multiple phased array ultrasonic transducers 100 may extend longitudinally (e.g., along the longitudinal axis 32) between the rams 50 and may facilitate monitoring the position of the rams 50 in the manner discussed above with respect to FIG. 5.

In some embodiments, similar to the embodiment discussed above with respect to FIG. 5, the multiple phased array ultrasonic transducers 100 may be arranged in multiple pairs positioned on opposite lateral sides of the body 54 of the BOP 40 to enable monitoring the components (e.g., the ram 50, the seal 104, and/or the tubular string 24) from both lateral sides of the body 54. Additionally, the phased array ultrasonic transducers 100 may be configured to operate in a pulse-echo mode and may include any of the features discussed above with respect to FIG. 5.

As discussed in more detail below, the reflected acoustic waves received by the phased array ultrasonic transducers 100 may be converted into electrical signals and provided to a controller (e.g., an electronic controller with a processor and a memory) coupled to the BOP 40. In some embodiments, the controller may be configured to process the signals to determine a position of the ram 50. In some embodiments, the controller may be configured to process the signals to determine a condition of a component of the BOP 40 and/or a condition of the tubular string 24. For example, the controller may be configured to determine whether the seal 104 is worn or deteriorated (e.g., a wear condition) based on the signals and/or whether the tubular string 24 is severed. In some embodiments, the controller may be configured to generate a visual representation (e.g., an image) of a component of the BOP 40 and/or of the tubular string 24. For example, the controller may be configured to generate and/or output an image (e.g., a two dimensional image) of the ram 50, the seal 104, and/or the tubular string 24. Thus, the embodiments may enable visualization of the ram 50, the seal 104, the bore 25, movement of the ram 50 within the bore 25, the tubular string 24, and/or a process of severing of the tubular string 24. In certain embodiments, one or more columns 114 of phased array transducers 100 may be provided to facilitate monitoring and/or imaging the ram 50, the seal 104, and/or the tubular string 24 and discrete ultrasonic transducers 28 may be arranged in one or more pairs 70 to facilitate monitoring a position of the rams 50 as discussed above with respect to FIGS. 2 and 3.

Figure 7:
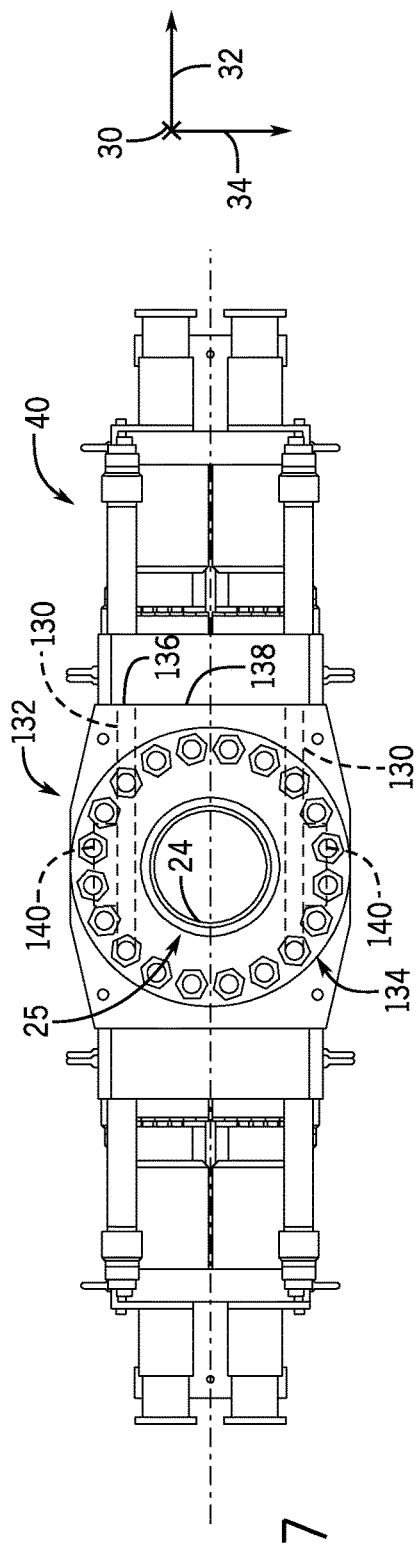
FIG. 7 is a top view of a portion of the BOP stack assembly of FIG. 2 having slots configured to support ultrasonic transducers.

FIG. 7 is a top view of a portion of the BOP 40 having slots 130 (e.g., openings or cavities) configured to support the ultrasonic transducers 28. One slot 130 may be positioned on a first lateral side 132 of the bore 25 and another slot 130 may be positioned on a second lateral side 134 of the bore 25, opposite the first side 132. Each of the one or more slots 130 extends along the longitudinal axis 32. Additionally, each of the slots 130 may be configured to receive one or more ultrasonic transducers 28 via an opening 136 formed in a longitudinally-facing surface 138 (e.g., relative to the longitudinal axis 32) of the body 54. For example, an array (e.g., a linear array, a row, or a cartridge) of multiple first transducers 28a that are coupled to one another may be inserted through the opening 136 and into one of the slots 130. The slots 130 may facilitate proper positioning of the ultrasonic transducers 28 relative to one another and/or relative to the rams 50. Additionally, the slots 130 may enable efficient removal of the ultrasonic transducers 28 for inspection, repair, and/or replacement. In some embodiments, one or more slots 140 may extend along the axial axis 30 to receive and to support the one or more columns 114 and/or the grids 113 of the multiple phased array ultrasonic transducers 100 discussed above with respect to FIG. 6.

Figure 8:
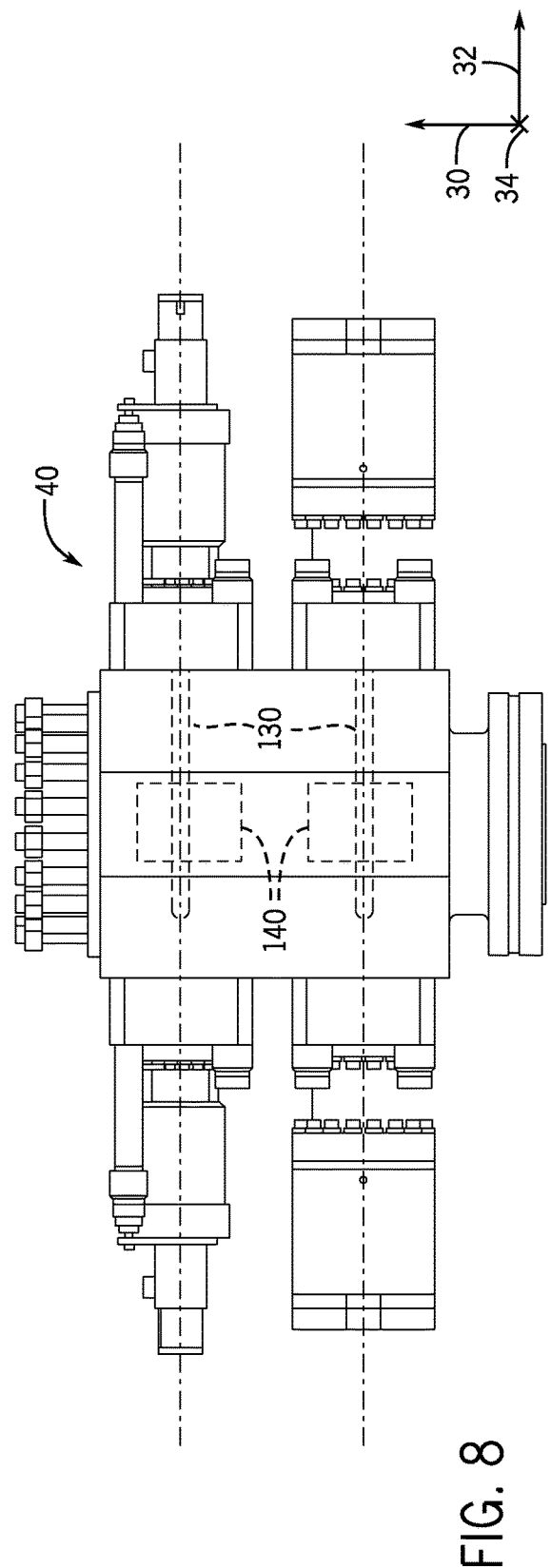
FIG. 8 is a side view of the portion of the BOP stack assembly of FIG. 8 having the slots configured to support the ultrasonic transducers.

FIG. 8 is a side view of the portion of the BOP 40 having the slots 130 configured to support the ultrasonic transducers 28. As shown, the slots 130 are axially aligned with the rams 50 to facilitate monitoring a position of the rams 50, although the slots 130 may be positioned in any suitable axial location to facilitate monitoring the various components of the BOP 40. In some embodiments, one or more slots 140 may extend along the axial axis 30 to receive and to support the one or more columns 114 and/or the grids 113 of the multiple phased array ultrasonic transducers 100 discussed above with respect to FIG. 6.

Figure 9:
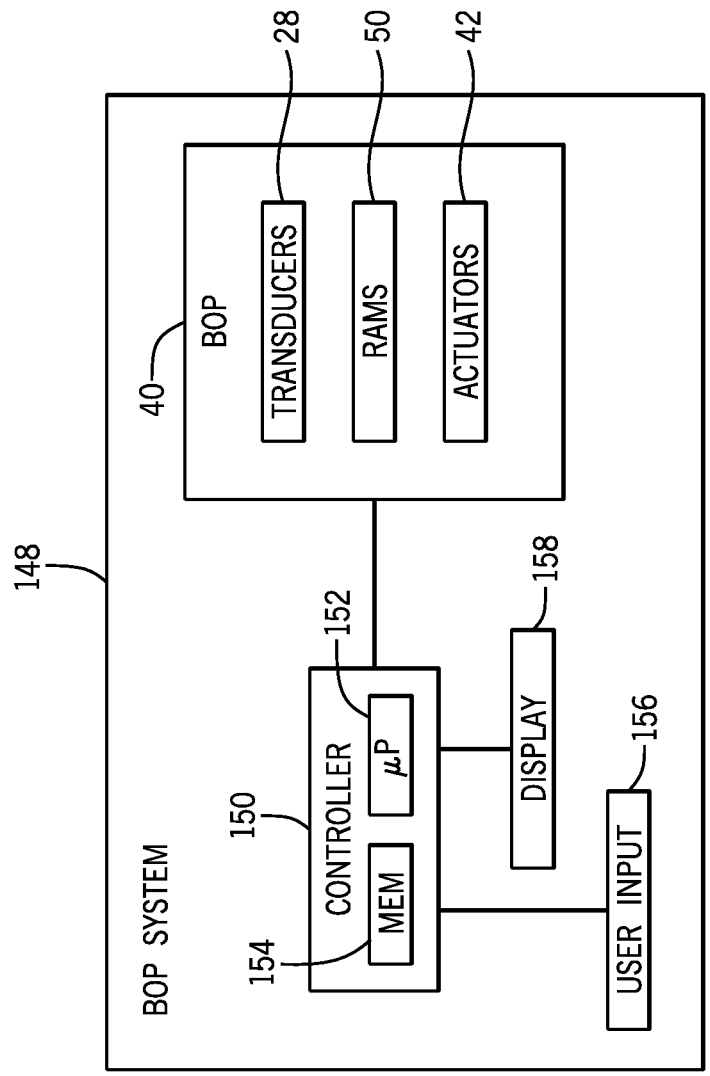
FIG. 9 is a schematic diagram of an embodiment of a system configured to monitor a position of a movable component of the BOP stack assembly of FIG. 2.

FIG. 9 is a schematic diagram of an embodiment of a BOP system 148 configured to monitor a position of a movable component (e.g., the rams 50, the piston 60) of the BOP 40. Additionally or alternatively, the system 148 may be configured to monitor a position of a piston of the hydraulic accumulator 46. Additionally or alternatively, the system 148 may be configured to monitor a condition (e.g., a wear condition, cracks, breakage, erosion, corrosion, or the like) of a component of the BOP 40, such as a condition of the seal 104. Additionally or alternatively, the system 148 may be configured to monitor a condition of the tubular string 24. As shown, each BOP 40 includes the actuators 42 configured to actuate (e.g., drive translation of) a respective ram 50. The system 148 also includes a controller 150 that may be coupled to various components of the BOP 40. In certain embodiments, the controller 150 is an electronic controller having electrical circuitry configured to process signals from and/or to provide control signals to certain components of the system 148.

In the illustrated embodiment, the controller 150 includes a processor, such as the illustrated microprocessor 152, and the memory device 154. The controller 150 may also include one or more storage devices and/or other suitable components. The processor 152 may be used to execute software, such as software for controlling the system 148. Moreover, the processor 152 may include multiple microprocessors, one or more "general-purpose" microprocessors, one or more special-purpose microprocessors, and/or one or more application specific integrated circuits (ASICS), or some combination thereof. For example, the processor 152 may include one or more reduced instruction set (RISC) or complex instruction set (CISC) processors.

The memory device 154 may include a volatile memory, such as random access memory (RAM), and/or a nonvolatile memory, such as ROM. The memory device 154 may store a variety of information and may be used for various purposes. For example, the memory device 154 may store processor-executable instructions (e.g., firmware or software) for the processor 152 to execute, such as instructions for controlling the system 148. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., position data, condition data, image data, thresholds, or the like), instructions (e.g., software or firmware for controlling the system 148, or the like), and any other suitable data.

In certain embodiments, the controller 150 is configured to control each actuator 42 to adjust a position of the respective ram 50. The controller 150 may be configured to control each actuator 42 automatically based on well conditions (e.g., well pressure) and/or based on an operator input received via a user input 156 (e.g., a switch, button, or the like), for example. The user input 156 may be part of a user interface that includes a display 158. In some embodiments, the user input 156 may be a virtual user input (e.g., displayed on a touch screen of the display 158) configured to receive the operator input.

In certain embodiments, the controller 150 is configured to provide a signal to drive one or more transducers 28 to emit an acoustic wave. In some embodiments, the controller 150 may provide the drive signal in response to an operator input received via the user input 156 and/or in response to initiation of movement of the rams 50. In some embodiments, the controller 150 may provide the drive signal continuously or periodically during movement of the rams 50 to facilitate monitoring of the movement of the rams 50. In some embodiments, the controller 150 may provide the drive signal continuously or periodically while the rams 50 are in the closed position 92 to facilitate monitoring the contact between the rams 50 and the tubular string 24.

In certain embodiments, the controller 150 may provide a drive signal to drive at least one transducer 28 (e.g., the first transducer 28a of one pair of transducers 70) to emit an acoustic wave. As noted above, the acoustic wave may be received by a corresponding transducer 28 (e.g., the second transducer 28b) disposed on an opposite side of the bore 25 or by the same transducer (e.g., the first transducer 28a) after reflection from the surface 78 of the ram 50. The transducers 28 may generate a signal in response to the detected acoustic wave that is indicative of a position of the ram 50. The controller 150 may be configured to receive and to process signals generated by the transducers 28 of the one or more pairs of ultrasonic transducers 70. In some embodiments, the controller 150 may be configured to determine a position of the rams 50 based on the signals, as discussed above.

Additionally or alternatively, the controller 150 may be configured to process the signals received from the transducers 28 to determine a condition (e.g., a wear condition, cracks, breakage, erosion, corrosion, velocity, acceleration, or the like) of components of the BOP 40. For example, in some embodiments, the controller 150 may be configured to monitor a velocity and/or an acceleration of the ram 50 based on signal integration of the signals received from the transducers 28 (e.g., based on a change in position over time), to compare the velocity and/or the acceleration to thresholds (e.g., predetermined thresholds stored in a memory device 154) related to an expected velocity and/or acceleration of the ram 50, and to determine a condition of components of the BOP system 148 (e.g., to determine whether components of the BOP system 148 are operating as expected, are damaged, or the like) based on the comparison. For example, if the velocity is below the predetermined threshold, the controller 150 may determine that mechanical components of the BOP 40 may not be operating correctly and the controller 150 may provide an indication (e.g., a displayed indication of the display 158 or an audible indication) that the velocity of the ram 50 is below the predetermined threshold and/or that the BOP 40 is not operating correctly. In some such embodiments, the controller 150 may provide instructions (e.g., displayed or audible instructions) to inspect, repair, and/or replace certain components of the BOP 40, for example.

As discussed above, the transducers 28 may include phased array ultrasonic transducers 100. In some such embodiments, the system 148 may be adapted to generate an image of various components of the BOP 40 (e.g., the ram 50, the piston 60, and/or the seal 104). The phased array ultrasonic transducers 100 may be configured to operate in a pulse-echo mode. Multiple phased array ultrasonic transducers 100 may extend longitudinally and/or axially along the body 54 of the BOP 40 and each phased array ultrasonic transducer 100 may be configured to steer its acoustic beam through the angle 108. Each phased array ultrasonic transducer 100 may detect a reflected acoustic wave (e.g., reflected from the surface 78 of the ram 50) and generate a signal based on the detected reflected acoustic wave.

In some embodiments, the controller 150 may be configured to process the signals to determine a position of the rams 50. For example, the controller 150 may be configured to generate an image (e.g., an outline image) of the rams 50 based on the signals received from the phased array ultrasonic transducers 100 and to determine the position of the rams 50 within the bore 25 based at least in part on the image (e.g., by aligning the image of the rams 50 within the monitored portion of the bore 25). In particular, the controller 150 may be configured to generate the image of the rams 50 or of any components disclosed herein via any suitable image processing technique. Once the image is formed, the controller 150 may apply techniques such as averaging, stacking, contrast enhancement, and/or histogram manipulation to facilitate analysis of the image. The controller 150 may then analyze the image via edge detection, pattern matching, or other techniques to identify elements of interest in the image, such as the ram 50 or the piston 60, and the position of the element of interest within the bore 25, for example. In some embodiments, the controller 150 may be configured to generate and/or output the position of the rams 50 and/or the image of the rams 50. For example, the controller may output the image of the rams 50 on the display 158 to enable an operator to visualize the position of the rams 50.

In some embodiments, the controller 150 may be configured to generate multiple images of the ram 50 as the ram 50 moves between the open position 52 and the closed position 92. In some embodiments, the controller 150 may generate an image at a rate of approximately one frame per second, or any other suitable rate (e.g., less than 5, 4, 3, 2, 1, 0.5 frames per second). The controller 150 may output the image and update the image over time, thereby enabling output of a video of the movement of the ram 50 in substantially real-time. The image may enable the operator to visualize the position of the ram 50 within the bore 25 and/or movement of the ram 50 within the bore 50. The user interface may enable the operator to interact with the image (e.g., via the user input 156 or via a touch screen of the display 158), thereby enabling the operator to select, replay, focus, or otherwise manipulate the image. Thus, the controller 150 may be part of a real time monitoring system configured to generate images and/or enable visualization of real-time movement and objects (e.g., the rams 50, the seals 104, the tubular string 24, or the like) within the BOP system 148.

In some embodiments, the controller 150 may be configured to determine a condition (e.g., a wear condition, cracks, breakage, erosion, corrosion, velocity, acceleration, or the like) of components of the BOP 40 (e.g. the seal 104 or mechanical components) based on the signals. For example, as discussed above, the controller 150 may be configured to monitor a velocity and/or an acceleration of the ram 50 based on the signals received from the phased array ultrasonic transducers 100, to compare the velocity and/or the acceleration to thresholds (e.g., predetermined thresholds stored in a memory device 154) related to an expected velocity and/or acceleration of the ram 50, and to determine a condition of components of the BOP system 148 (e.g., to determine whether components of the BOP system 148 are operating as expected, are damaged, or the like) based on the comparison. In some embodiments, the controller 150 may be configured to monitor the velocity and/or the acceleration of the ram 50 based on signal integration of signals received from individual ultrasonic transducers 28 (e.g., phased array ultrasonic transducers 100) or based on images generated via image processing techniques using the signals received from the phased array ultrasonic transducers 100.

Additionally or alternatively, acoustic waves may be reflected by one or more seals 104 on the contacting surface 77 of the ram 50. The signal generated by the phased array ultrasonic transducers 100 in response to detection of these reflected acoustic waves may enable the controller 150 to determine a condition of the seal 104. For example, the controller 150 may be configured to determine a thickness of the seal based on the signal, to compare the thickness to thresholds (e.g., predetermined thresholds stored in a memory device 154) related to an acceptable thickness of the seal 104, and to determine a condition of the seal 104 based on the comparison. In some embodiments, the controller 150 may be configured to detect anomalies or defects of the seal 104 (e.g., in a surface of the seal 104) via any suitable image processing and/or analysis techniques. For example, the controller 150 may analyze the image via pattern matching (e.g., comparing the image to one or more reference images of damaged and/or intact seals 104 stored in the memory device 154) to detect defects and/or to classify the defects (e.g., classify the type of defect, such as a tear, and/or the severity of the defect) based on defect characteristics (e.g., size, depth, geometry, or the like). In some embodiments, the controller 150 may provide an output indicative of the condition of the seal 104. For example, the controller 150 may provide an output indicative of the measured thickness of the seal 104 compared to an initial thickness and/or compared to the acceptable thickness (e.g., a percentage). In some embodiments, the controller 150 may output instructions (e.g., displayed or audible instructions) to inspect, repair, and/or replace the seal 104, for example. In certain embodiments, the controller 150 may generate and output an image of the seal 104, thereby enabling the operator to visualize the condition of the seal 104. For example, wear and/or imperfections in the seal 104 may be visible and/or highlighted in the image. Although the detection of defects is discussed in the context of the seal 104 to facilitate discussion, it should be understood that the phased array ultrasonic transducers 100 and these techniques for detecting defects may be applied to any component within or associated with the BOP system 148, such as the rams 50, the tubular string 24, or the like.

Additionally or alternatively, the system 148 may be adapted to generate an image of the tubular string 24 extending through the bore 25 of the BOP 40 using the phased array ultrasonic transducers 100. As noted above, the phased array ultrasonic transducers 100 may be configured to operate in a pulse-echo mode, and the controller 150 may be configured to electronically steer (e.g., guide or sweep) each acoustic beam through the angle 108. Each phased array ultrasonic transducer 100 may detect a reflected acoustic wave (i.e., reflected from the tubular string 24) and generate a signal based on the detected reflected acoustic wave. The controller 150 may receive the signal and may generate an image (e.g., an outline image) of the tubular string 24. In some embodiments, the controller 150 may be configured to generate multiple images of the tubular string 24 and/or the ram 50 as the ram 50 severs the tubular string 24. In some embodiments, the controller 150 may generate an image at a rate of approximately one frame per second, or any other suitable rate (e.g., less than 5, 4, 3, 2, 1, 0.5 frames per second). The controller 150 may output the image and update the image over time, thereby enabling output of a video of the movement of the ram 50 and/or severing of the tubular string 24 in substantially real-time. The image may enable the operator to visualize a state (e.g., a condition) of the tubular string 24, including whether the tubular string 24 was severed by the ram 50. In some embodiments, the controller 150 may be configured to overlay the image (e.g., the current image) over a baseline image (e.g., intact tubular string 24 or the tubular string 24 prior to operation of the offshore system 10) on the display 158, or otherwise display both the current image and the baseline image (e.g., side-by-side) to enable the operator to visualize changes. In addition to the examples provided above, the system 148 of FIG. 9 may be adapted to perform any of the monitoring methods or techniques disclosed herein. For example, the system 148 may be adapted to monitor a position of a piston of the hydraulic accumulator 46 discussed below with respect to FIG. 13.

Figure 10:
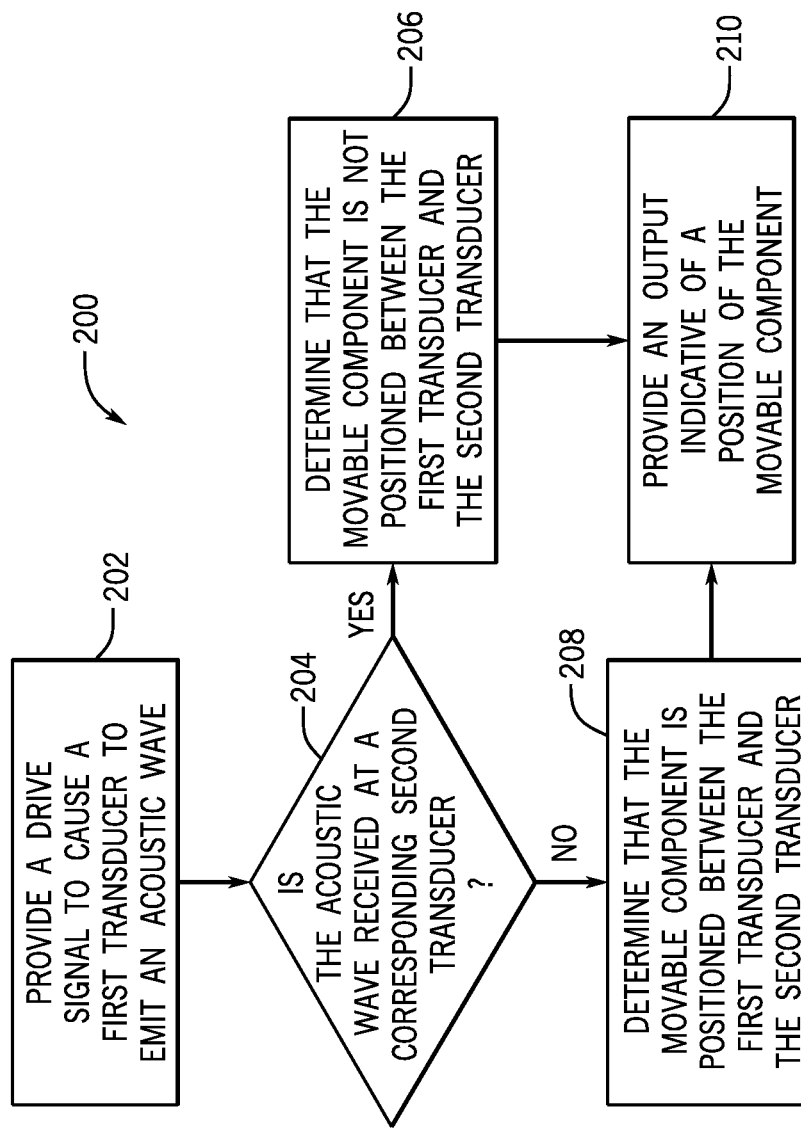
FIG. 10 is a flow diagram of an embodiment of a method for monitoring a position of a movable component of the BOP stack assembly of FIG. 2.
Figure 11:
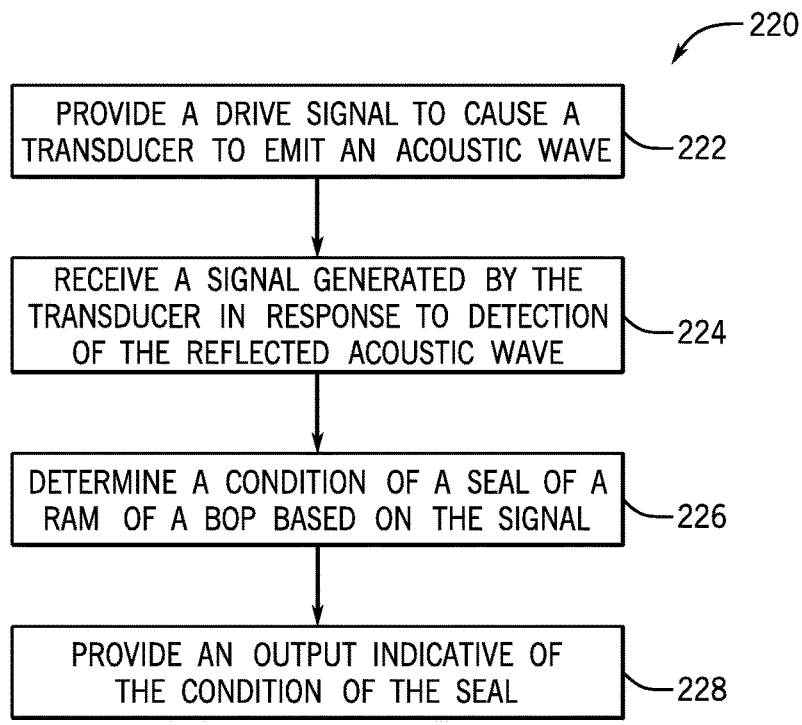
FIG. 11 is a flow diagram of an embodiment of a method for monitoring a condition of a seal of a ram of the BOP stack assembly of FIG. 2.
Figure 12:
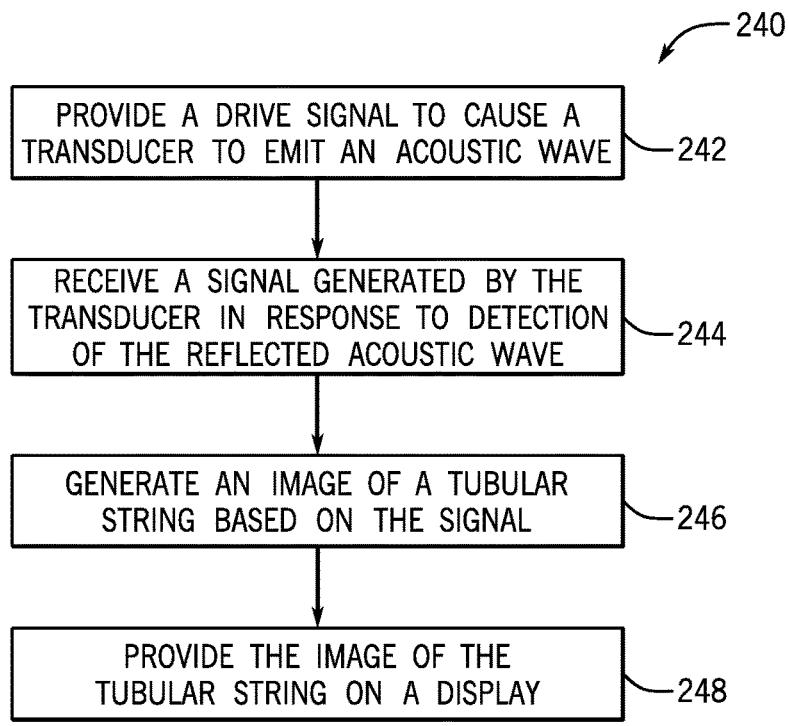
FIG. 12 is a flow diagram of an embodiment of a method for monitoring a tubular string extending through a bore of the BOP stack assembly of FIG. 2.

FIGS. 10, 11, and 12 are flow charts illustrating various methods for monitoring components (e.g., the ram 50, the seal 104, and/or the piston 60) of the BOP stack assembly 38 and/or the tubular string 24, in accordance with the present disclosure. The methods include various steps represented by blocks. It should be noted any of the methods provided herein, may be performed as an automated procedure by a system, such as system 148. Although the flow charts illustrate the steps in a certain sequence, it should be understood that the steps may be performed in any suitable order and certain steps may be carried out simultaneously, where appropriate. Further, certain steps or portions of the methods may be performed by separate devices. For example, a first portion of the method may be performed by the processor 152, while a second portion of the method may be performed by a separate processing device. As noted above, the methods for monitoring components of the BOP stack assembly 38 and/or the tubular string 24 may be initiated automatically (e.g., in response to initiation of movement of the rams 50) or in response to operator input (e.g., via user input 156).

FIG. 10 is a flow diagram of an embodiment of a method 200 for monitoring a position of a movable component (e.g., the ram 50 or the piston 60) of the BOP 40. The method 200 may be adapted to monitor a position of the piston of the hydraulic accumulator 46 discussed below with respect to FIG. 13. As shown, the method 200 may begin with the controller 150 providing a drive signal to cause one transducer (e.g., the first transducer 28a) to emit an acoustic wave in step 202. As discussed above with respect to FIGS. 3 and 4, the transducers 28 may be discrete transducers arranged in one or more pairs of ultrasonic transducers 70 and may be operated in a pitch-catch mode. In such cases, the first transducer 28a and the second transducer 28b of each pair of ultrasonic transducers 70 are disposed on opposite lateral sides of the bore 25 of the BOP 40. In step 204, the controller 150 may determine whether the acoustic wave is received at the corresponding second transducer 28b.

If the acoustic wave is received at the corresponding second transducer 28b, the controller 150 may determine that the movable component is not positioned between the first and second transducers 28a, 28b in step 206. However, if the acoustic wave is not received at the corresponding second transducer 28b, the controller 150 may determine that the movable component is positioned between the first and second transducers 28a, 28b in step 208. The number of transducers 28 and/or the spacing between the transducers 28 affects the accuracy of the position determination (e.g., more transducers 28 and/or closer spacing provides greater accuracy). In some embodiments, the controller 150 may provide an output indicative of the position of the movable component in step 210. For example, the controller 150 may provide a displayed output on the display 158 indicating that the movable component is in the open position 52, the closed position 92, or a position therebetween.

As noted above, in some embodiments, the transducers 28 may be phased array ultrasonic transducers 100 that are configured to operate in a pulse-echo mode. In such embodiments, the controller 150 may be configured to determine the position of the movable component based on whether a reflected acoustic wave (e.g., reflected by the surface 78 of the ram 50) is received at the phased array ultrasonic transducer 100. Thus, the method 200 may be adapted to monitor the position of the movable component based on detection of the reflected acoustic wave using phased array ultrasonic transducers 100. In some such embodiments, the displayed output may include an image of the movable component. In some embodiments, the displayed output may include a video depicting movement of the movable component over time.

FIG. 11 is a flow diagram of an embodiment of a method 220 for monitoring a condition (e.g., a wear condition, cracks, breakage, erosion, or the like) of the seal 104 of the BOP 40. The method 220 may be carried out by the system 148 having multiple phased array ultrasonic transducers 100. As discussed above with respect to FIGS. 5 and 6, the phased array ultrasonic transducers 100 may be configured to operate in a pulse-echo mode. In step 222, the controller 150 may provide a drive signal to cause one phased array ultrasonic transducer 100 to emit an acoustic wave. In step 224, the controller 150 may receive a signal generated by the phased array ultrasonic transducer 100 in response to the reflected acoustic wave (e.g., reflected from a surface of the seal 104).

In step 226, the controller 150 may process the signal to determine a condition of the seal 104. For example, the controller 150 may be configured to determine a thickness of the seal based on the signal, to compare the thickness to predetermined thresholds (e.g., stored in the memory device 154) related to an acceptable thickness of the seal 104, and to determine a condition of the seal 104 based on the comparison. In some embodiments, the controller 150 may generate an image of the seal 104 and compare the image to a stored image of the seal 104 (e.g., stored in the memory device 154), which may enable identification of imperfections in the seal 104.

In step 228, the controller 150 may provide an output indicative of the condition of the seal 104. For example, the controller 150 may provide an output indicative of the measured thickness of the seal 104 compared to an initial thickness and/or compared to the acceptable thickness (e.g., a percentage). In some embodiments, the controller 150 may output instructions (e.g., displayed or audible instructions) to inspect, repair, and/or replace the seal 104, for example. In certain embodiments, the controller 150 may generate and output an image of the seal 104, thereby enabling the operator to visualize the condition of the seal 104. For example, wear and/or imperfections in the seal 104 may be visible in the image. It should be understood that the method 220 may be adapted to determine the condition of various other components of the BOP stack assembly 38, such as the condition of the ram 50, the piston 60, or the like.

FIG. 12 is a flow diagram of an embodiment of a method 240 for monitoring the tubular string 24 extending through the bore 25 of the BOP 40. The method 240 may be carried out by the system 148 having multiple phased array ultrasonic transducers 100. As discussed above with respect to FIGS. 5 and 6, the phased array ultrasonic transducers 100 may be configured to operate in a pulse-echo mode. In step 242, the controller 150 may provide a drive signal to cause one phased array ultrasonic transducer 100 to emit an acoustic wave. In step 244, the controller 150 may receive a signal generated by the phased array ultrasonic transducer 100 in response to the reflected acoustic wave (e.g., reflected from a surface of the tubular string 24).

In step 246, the controller 150 may process the signal to generate an image of the tubular string 24. In step 248, the controller 150 may provide the image of the tubular string 24 on the display 158, thereby enabling the operator to visualize the tubular string 24. In some embodiments, the steps of method 240 may be repeated over time such that the controller 150 generates multiple images of the tubular string 24 and/or the ram 50 as the ram 50 severs the tubular string 24. In some embodiments, the controller 150 may generate an image at a rate of approximately one frame per second, or any other suitable rate (e.g., less than 5, 4, 3, 2, 1, 0.5 frames per second). In some such cases, the controller 150 may output the image and update the image over time, thereby enabling output of a video of the movement of the ram 50 and/or severing of the tubular string 24 in substantially real-time. The image may enable the operator to visualize a state (e.g., a condition, a wear condition, cracks, breakage, erosion, corrosion, or the like) of the tubular string 24, including whether the tubular string 24 was severed by the ram 50.

It should be understood that the steps of the method 240 may be adapted to enable imaging of the tubular string 24 and/or the relative position of the rams 50 (e.g., pipe rams or variable bore rams) to one another and to the tubular string 24 during sealing of the annulus about the tubular string 24. Such techniques may enable monitoring and/or visualization of a distance between the rams 50 in order to determine if the rams 50 adequately contact one another about the tubular string 24 when the rams 50 are in the closed position 92.

Figure 13:
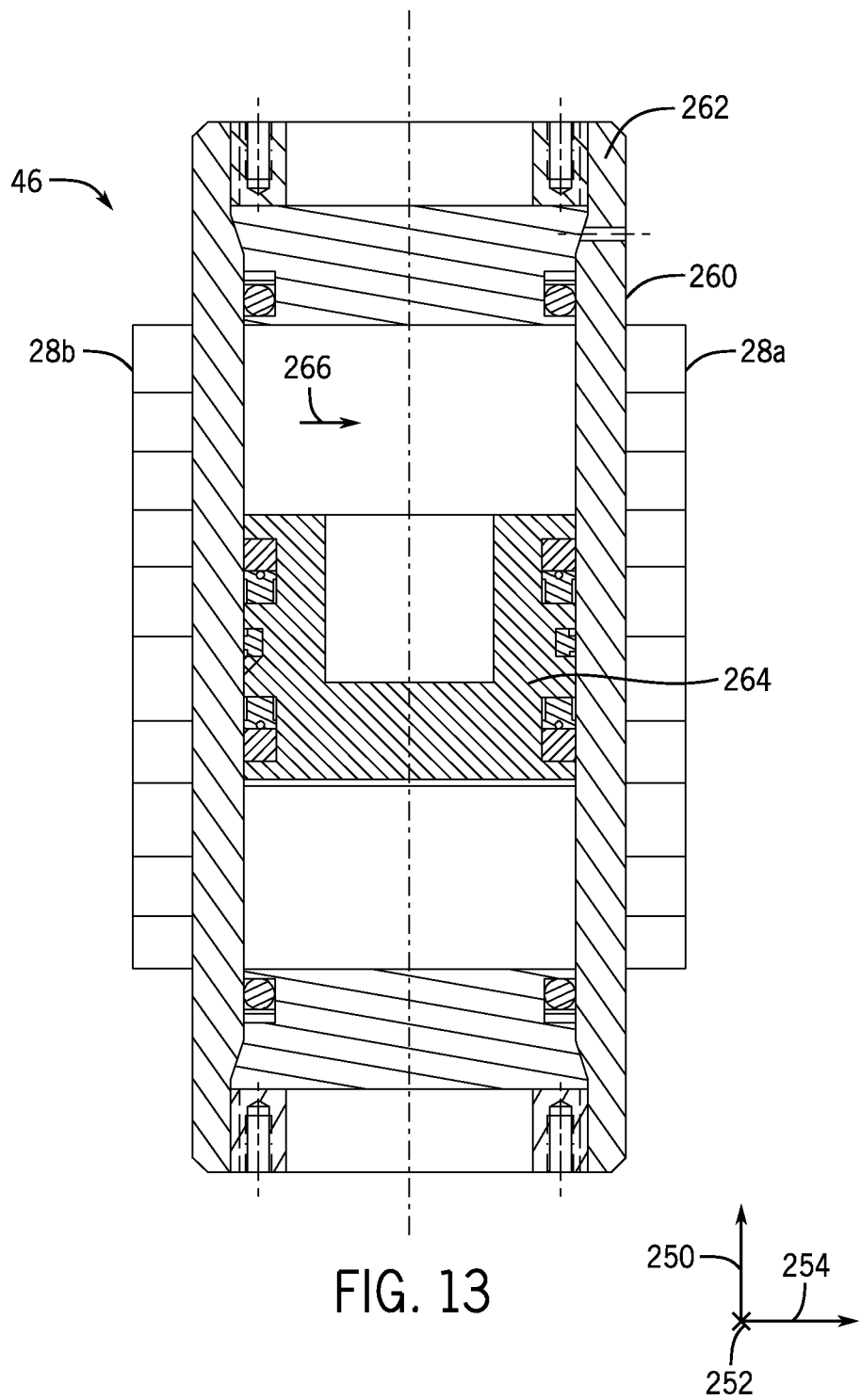
FIG. 13 is a cross-sectional side view of a portion of an accumulator of the BOP stack assembly of FIG. 2 having ultrasonic transducers.

FIG. 13 is a cross-sectional side view of a portion of the hydraulic accumulator 46 of the BOP stack assembly 38. The hydraulic accumulator 46 may be described with reference to an axial axis or direction 250, a longitudinal axis or direction 252, and a lateral axis or direction 254. As shown, ultrasonic transducers 28 are coupled to opposite lateral sides of an exterior surface 260 of a body 262 of the hydraulic accumulator 46 to facilitate monitoring a position of a piston 264. The ultrasonic transducers 28 may include any features discussed above. For example, the ultrasonic transducers 28 may be arranged to form one or more pairs of ultrasonic transducers 70. Furthermore, in some embodiments, the first transducer 28a and the second transducer 28b may be discrete transducers each having one or more piezoelectric elements.

In some embodiments, the first transducer 28a and the second transducer 28b may be configured to operate in a pitch catch mode in which an acoustic wave emitted by one transducer is detected by another corresponding transducer. For example, the first transducer 28a may emit an acoustic wave in a direction approximately perpendicular to a direction of travel of the piston 264 (e.g., perpendicular to the axial axis 250) along a path 266 toward the corresponding second transducer 28b. The corresponding second transducer 28b may detect the acoustic wave if the piston 264 does not block the path 266. Thus, detection of the acoustic wave at the second transducer 28b and/or absence of detection of the acoustic wave at the second transducer 28b may be indicative of a position (e.g., along the axial axis 250) of the piston 264. In some embodiments, the transducers 28 may be phased array ultrasonic transducers 100 configured to operate in a pulse-echo mode and to determine the position of the piston 264 based at least in part on an image of the piston 264, in the manner discussed above with respect to FIG. 5.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A monitoring system for a blowout preventer (BOP) stack assembly, comprising:
    one or more pairs of ultrasonic transducers coupled to a body that is configured to support a movable component of the BOP stack assembly, wherein each pair of ultrasonic transducers comprises a first ultrasonic transducer disposed on a first side of the body and a second ultrasonic transducer disposed on a second side of the body, opposite the first side; and
    a controller configured to receive a first signal indicative of a position of the movable component from the one or more pairs of ultrasonic transducers, to determine the position of the movable component based on the first signal, and to provide a first output indicative of the position of the movable component;
    wherein at least one of the one or more pairs of ultrasonic transducers is configured to operate in a pitch catch mode in which the first ultrasonic transducer is configured to emit an acoustic wave and the second ultrasonic transducer is configured to receive the acoustic wave.

2. The system of claim 1, wherein each of the one or more pairs of ultrasonic transducers is configured to operate in a pitch catch mode in which the first ultrasonic transducer is configured to emit an acoustic wave and the second ultrasonic transducer is configured to receive the acoustic wave.

3. The system of claim 1, wherein the one or more pairs of ultrasonic transducers comprise phased array transducers.

4. The system of claim 1, wherein the movable component comprises a ram of a BOP of the BOP stack assembly.

5. The system of claim 1, wherein the movable component comprises a piston of an actuator that is configured to drive a ram of a BOP of the BOP stack assembly.

6. The system of claim 1, wherein the movable component comprises a piston of an accumulator of the BOP stack assembly.

7. The system of claim 1, wherein the controller is configured to generate an image of the movable component in real-time based on the first signal, and the first output comprises a displayed image of the movable component.

8. The system of claim 1, wherein the first output comprises a video depicting movement of the movable component.

9. The system of claim 1, wherein the one or more pairs of ultrasonic transducers are configured to generate a second signal indicative of a condition of an element of the BOP stack assembly, and the controller is configured to receive the second signal, to determine the condition of the element based on the second signal, and to provide a second output indicative of the condition of the element.

10. The system of claim 9, wherein the element is a seal disposed on a surface of the movable component and the second output comprises a displayed image of the seal.

11. The system of claim 1, wherein the one or more pairs of ultrasonic transducers are configured to generate a second signal indicative of a condition of a tubular string extending through a bore of the body, and the controller is configured to receive the second signal, to determine the condition of the tubular string based on the second signal, and to provide a displayed image indicative of the condition of the tubular string.

12. The system of claim 1, wherein the controller is configured to determine a velocity or an acceleration of the movable component based on the first signal.

13. A blowout preventer (BOP) system, comprising:
a body configured to support a movable component of a BOP stack assembly; and one or more pairs of ultrasonic transducers coupled to the body, wherein each pair of ultrasonic transducers comprises a first ultrasonic transducer disposed on a first side of the body and a second ultrasonic transducer disposed on a second side of the body, opposite the first side, and wherein the one or more pairs of ultrasonic transducers are configured to generate a signal indicative of a position of the movable component, and wherein at least one of the one or more pairs of ultrasonic transducers is configured to operate in a pitch catch mode in which the first ultrasonic transducer is configured to emit an acoustic wave and the second ultrasonic transducer is configured to receive the acoustic wave.

14. The system of claim 13, wherein each of the one or more pairs of ultrasonic transducers is configured to operate in a pitch catch mode in which the first ultrasonic transducer is configured to emit an acoustic wave and the second ultrasonic transducer is configured to receive the acoustic wave.

15. The system of claim 13, wherein the movable component comprises a ram of a BOP of the BOP stack assembly.

16. The system of claim 13, wherein the one or more pairs of ultrasonic transducers comprise multiple pairs of ultrasonic transducers extending along a longitudinal axis of the body that is parallel to a direction of movement of the movable component.

17. The system of claim 13, wherein the one or more pairs of ultrasonic transducers comprise multiple pairs of transducers extending along an axial axis of the body that is perpendicular to a direction of movement of the movable component.

18. The system of claim 13, wherein the one or more pairs of transducers comprise phased array transducers.

19. A method for monitoring a blowout preventer (BOP) stack assembly, the method comprising using a processor to:
provide a drive signal to cause a first transducer to emit an acoustic wave, wherein the first transducer is disposed on a first side of a body configured to support a movable component of the BOP stack assembly and is configured to emit the acoustic wave toward a corresponding second transducer disposed on a second side of the body, opposite the first side;
determine a position of the movable component based on whether the acoustic wave is received at the corresponding second transducer; and
provide a displayed output indicative of the position of the movable component.

20. The method of claim 19, wherein the movable component comprises a ram of a BOP of the BOP stack assembly.

* * * * *